Jan. 6, 1959
L. C. WANGEROW
2,867,160
WATERSTOP CONNECTION
Filed Oct. 1, 1954
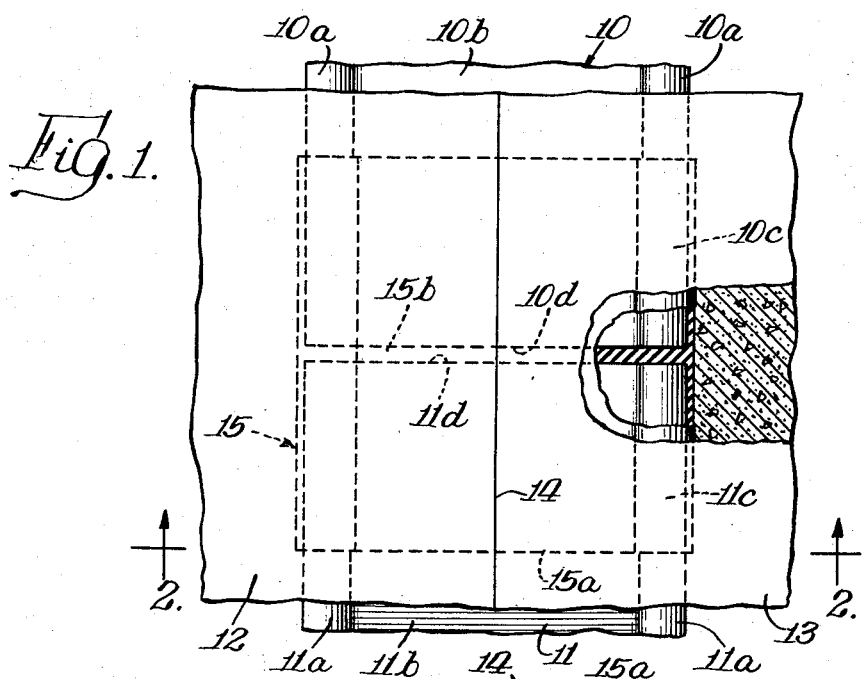
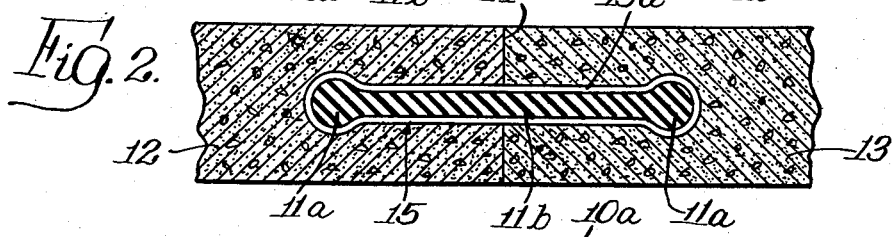
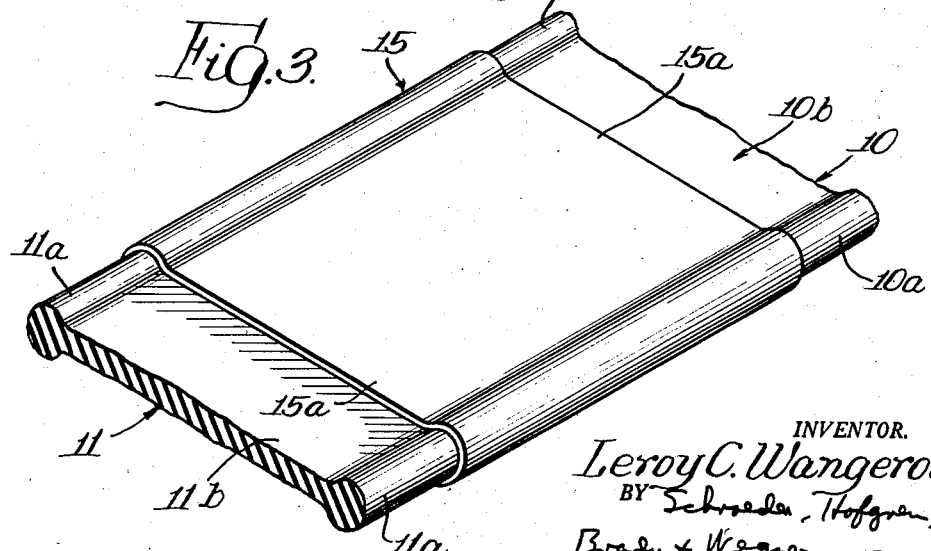
INVENTOR.
Leroy C. Wangerow,
BY Schroeder, Hofgren,
Brady & Wegner Atty's.

United States Patent Office 2,867,160
Patented Jan. 6, 1959

2,867,160

WATERSTOP CONNECTION

Leroy C. Wangerow, Chicago, Ill., assignor to Servicised Products Corporation, a corporation of Delaware Application October 1, 1954, Serial No. 459,619

3 Claims. (Cl. 94—18)

This invention relates to a connector for joining the end portions of a pair of adjacent flexible waterstops bridging a joint between construction members.

In construction work, particularly with construction members of concrete such as roads, buildings, stadiums, walks and the like, the joints between construction members are ordinarily provided with fluid barriers commonly known as waterstops. These waterstops which may be of a flexible rubbery material have various cross-sectional shapes and are usually relatively flat when compared to the width. A common type of waterstop is provided with edge enlarged portions or bulbs, with one side of the waterstop embedded in one construction member, the other side embedded in the opposite construction member and a central portion bridging the joint. The waterstops are made in various cross-sectional shapes and have various dimensions, depending upon the particular installation.

These rubber stops are ordinarily of varying lengths and when used to bridge a relatively long joint must be joined in end-to-end relationship with the end portions of adjacent waterstops being sealed to each other in order to provide a continuous barrier at the joint.

The sealing of the adjacent ends of a pair of waterstops is quite difficult in order to insure a fluid-tight seal being formed. A common method has been to employ a heat producing vulcanizing unit for vulcanizing the ends of the waterstops in contact with each other. This is not too satisfactory a procedure, however, as the equipment which is relatively bulky must be moved from place to place as the job progresses and from job to job. Furthermore, conditions are not always such that the field vulcanizing unit can be efficiently employed.

In order to avoid the expense and difficulty of using such a field vulcanizing unit, various types of cold cemented splices have been proposed and used at various times. These have included a plain butt splice in which the two ends of the adjacent waterstops are abutted against each other with an adhesive material such as a rubber cement vulcanizable at room temperature between. Another such splice has been a beveled butt splice in which the contacting surfaces are beveled and also employing such an adhesive, and a lap splice in which the ends are lapped with the adhesive between. Various other types of splices have been proposed from time to time but have not been widely adopted.

The present invention provides an improved connector for joining the end portions of a pair of adjacent waterstops. One of the objects of this invention, therefore, is to provide an improved connector comprising a flexible hollow shell having sockets receiving said end portions, the sockets having relatively thin side walls overlapping relatively large areas of the sides of the end portions for joining to these areas, the walls having substantially the same cross-sectional configuration as the end portions and closely embracing the end portions.

Another object of the invention is to provide an improved connector comprising a flexible hollow molded shell of elastic rubbery material having end sockets receiving the waterstop end portions, the sockets having relatively thin side walls overlapping relatively large areas of the sides of the end portions for joining to these areas, the walls having substantially the same cross-sectional configuration as the end portions and closely embracing the end portions, and a transverse inner web integral with the shell against which the extreme ends may abut when the end portions are within the connector.

Other objects and advantages of the invention will be apparent from the following description of one embodiment of the invention as disclosed in the accompanying drawings. Of the drawings:

Fig. 1 is a fragmentary plan view, partially broken away for clarity of illustration, of a joint between construction members including a pair of aligned waterstops joined together with a connector embodying this invention.

Fig. 2 is a vertical section, taken substantially along line 2—2 of Fig. 1.

Fig. 3 is a fragmentary perspective view of a pair of aligned waterstops joined together by means of the connector illustrated in the preceding drawings.

The waterstops 10 and 11 shown in the drawings are aligned to form a continuous waterstop between a pair of concrete construction members 12 and 13. These construction members are adjacent to each other to form a joint 14.

In the embodiment shown, the aligned waterstops 10 and 11 are provided with bulbous edge portions 10a and 11a here serving as anchoring means in the concrete and center web portions 10b and 11b. These web portions bridge the joint 14 at substantially the centers of the web portions and the opposite sides of the waterstops are embedded in the construction members 12 and 13, as illustrated in Fig. 2.

In order to attach the adjacent end portions 10c and 11c together in fluid-tight relationship, there is provided a connector 15 at these end portions. This connector comprises a flexible hollow shell having sockets 15a of relatively great depth at opposite ends of the shell. Each socket has relatively thin walls that overlap large areas of the sides of the end portions 10c and 11c in order to provide large areas for joining the waterstops 10 and 11 to the connector 15. The walls defining these sockets have substantially the same cross-sectional configuration as the end portions 10c and 11c of the waterstops and closely embrace the waterstop end portions, as is shown in Fig. 3.

In the preferred construction, the extreme ends 10d and 11d are closely adjacent to each other within the connector 15. In this preferred construction a transverse web 15b is provided extending transversely across the interior of the connector with the ends 10d and 11d of the waterstops abutting against this web.

In the preferred construction, the connector is flexible and preferably made of an elastic, rubbery material such as any of the common natural and synthetic rubbers. These rubbers, their use and compounding are well understood by those skilled in the art. The connector is preferably molded so that the walls forming the sockets 15a and the web 15b are integral.

When the connector is assembled with the end portions of the waterstops, the contacting surfaces of the waterstops and the connector are coated with a fluid impervious adhesive material that will form a strong bond at ordinary room temperatures. Such an adhesive may be a natural or synthetic rubber cement of the ordinary air dry type containing rubber dissolved in a solvent. It may also be a natural or synthetic rubber cement containing the usual vulcanizing ingredients including accelerators that will cause the rubber cement to become vulcanized on standing at ordinary outdoor temperatures. These cements, their compounding and use in such an environment are well understood by those skilled in the art. The adhesive material may also be a rubber-asphalt-oil composition of the type widely used in construction joints. Typical materials of this type are disclosed in the following U. S. patents: A. C. Fischer Patent Nos. 2,368,650; 2,431,384; 2,431,385; 2,431,386; 2,454,506; 2,517,778; 2,540,251; 2,540,252 and A. C. Fischer and W. H. Walker Patent Nos. 2,511,830 and 2,625,522.

The connector of this invention has a number of advantages over prior splicing techniques. Thus, the connector being thin does not add materially to the over-all thickness of the waterstop. Furthermore, as the walls of the connector closely embrace the end portions of the waterstops, it is relatively easy to secure a fluid-tight secure seal.

The center web in the preferred embodiment of the invention serves not only to center the ends of the waterstops within the connector automatically but also aids in holding the sockets open to receive the waterstop ends. The web also provides additional surface in contact with the waterstops to provide a stronger construction.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A waterstop barrier structure adapted to bridge a joint between construction members, comprising: a pair of rubbery, flexible, elongated waterstop strips each having a width between opposite side edges considerably greater than its thickness and adapted to have said opposite side edges arranged on opposite sides of said joint, the side edges being provided with anchoring means, one end portion of one strip being adjacent to an end portion of the other strip; and a rubbery, flexible preformed connector sleeve having thin side walls defining the sides of a pair of end sockets receiving said end portions, each socket having a preformed transverse shape conforming to the shape of one of said end portions.

2. A waterstop barrier structure adapted to bridge a joint between construction members, comprising: a pair of rubbery, flexible, elongated waterstop strips each having a width between opposite side edges considerably greater than its thickness and adapted to have said opposite side edges arranged on opposite sides of said joint, the side edges being provided with anchoring means, one end portion of one strip being adjacent to an end portion of the other strip; and a rubbery, flexible preformed connector sleeve having thin side walls and an intermediate transverse web, the walls and web cooperating to provide a pair of end sockets receiving said end portions, each socket having a preformed transverse shape conforming to the shape of one of said end portions.

3. The waterstop barrier structure of claim 2 wherein said anchoring means comprises edge enlargements on said waterstop strips of a thickness greater than the adjacent portions of said strip.

References Cited in the file of this patent

UNITED STATES PATENTS

| | | |
|---|---|---|
| 317,157 | Lowrie | May 5, 1885 |
| 317,549 | Koch | May 12, 1885 |
| 1,646,427 | Skidmore, Jr. | Oct. 25, 1927 |
| 2,166,376 | Saurer | July 18, 1939 |
| 2,228,052 | Gardner | Jan. 7, 1941 |
| 2,295,316 | Yates | Sept. 8, 1942 |
| 2,368,650 | Fischer | Feb. 6, 1945 |
| 2,400,493 | Fischer | May 21, 1946 |
| 2,401,229 | Cohen | May 28, 1946 |
| 2,699,656 | Anderson | Jan. 18, 1955 |
| 2,765,580 | Herrschaft | Oct. 9, 1956 |

FOREIGN PATENTS

| | | |
|---|---|---|
| 579,710 | Great Britain | Aug. 13, 1946 |

OTHER REFERENCES

Publication: The American City, July 1948, page 27.